United States Patent Office.

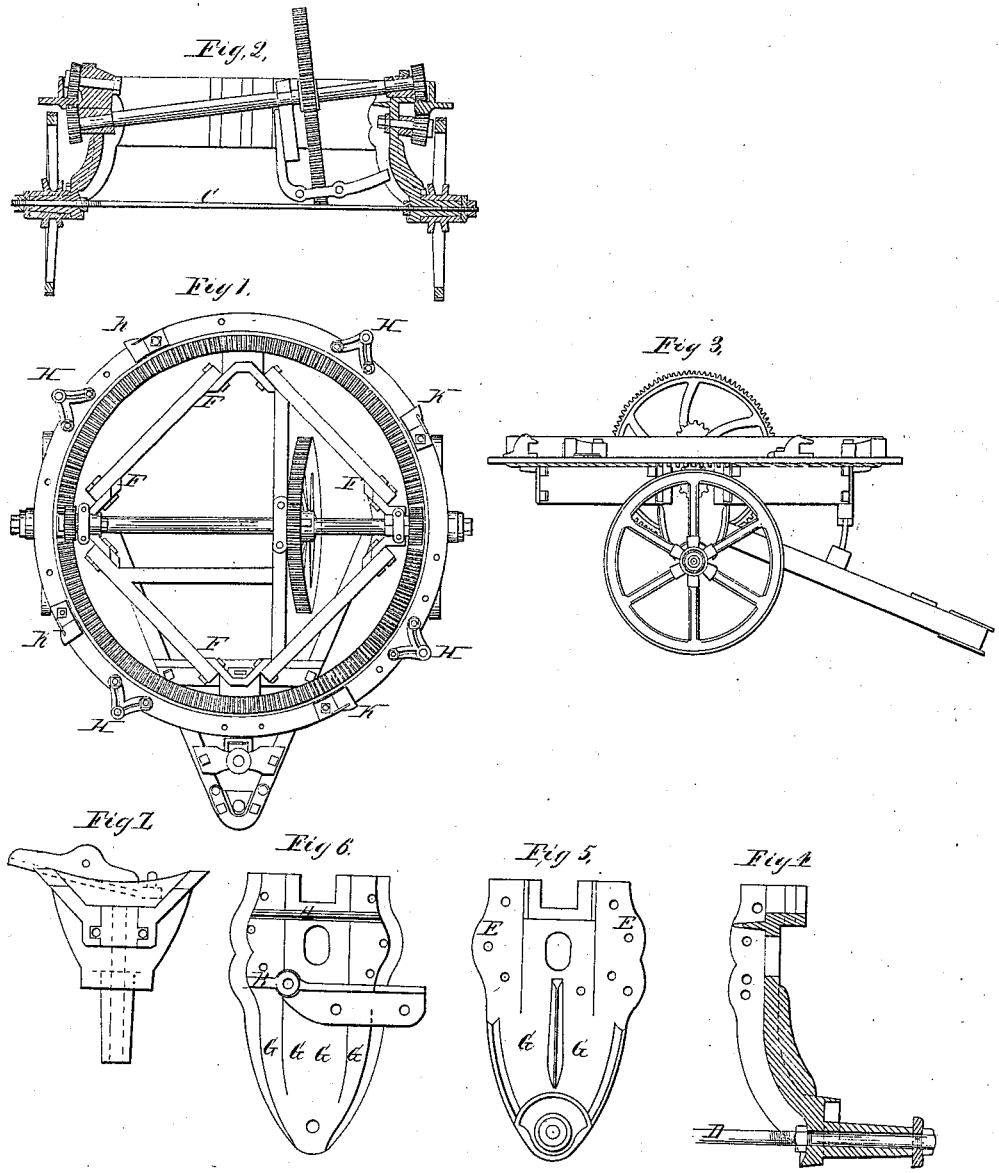

MASSENA B. ERSKINE, OF RACINE, WISCONSIN.

Letters Patent No. 107,237, dated September 13, 1870.

IMPROVEMENT IN MOUNTED HORSE-POWER.

The Schedule referred to in these Letters Patent and making part of the same.

*To all whom it may concern:*

Be it known that I, MASSENA B. ERSKINE, of the city and county of Racine, in the State of Wisconsin, have invented a new and useful Improvement of the Woodbury or Mounted Horse-Power; and I do hereby declare that the following is a full, clear, and exact description of the construction and operation of the same, reference being had to the annexed drawing making a part of this specification, of which—

Figure 1 is a plan;
Figure 2, a perpendicular section;
Figure 3, a side elevation;
Figure 4, a section of the axle;
Figure 5, the outside view of the upright part of the axle;
Figure 6, the inside view of the upright part of the axle; and
Figure 7, the lower and horizontal parts of the axle.

My claim is for an improvement.

I do not claim to be the original inventor of the Woodbury horse-power.

My improvement consists in the means of strengthening the horse-power, and particularly the axles, and thus rendering the machine more efficient and useful.

My invention consists—

First, in the shape and form of the axles as now manufactured by me. As originally made, the axles did not permit the wheels to stand perpendicular, whereas, the form I give to them does. The wheels are, therefore, not liable to break, as they were with the axle in the form given to it by the inventor of the Woodbury power.

Secondly, in greatly strengthening the axle by the iron support, marked A, in fig. 6, thus effectually preventing it from splitting, to which, before my invention, it was liable.

Thirdly, in the use and arrangement of the wrought-iron eye-bolt, marked B, in fig. 6, by means of which the pins, which connect the V-pieces to the axles, are greatly strengthened.

Fourthly, in so enlarging and shaping that portion of the axle outside of the bolt-holes, marked E, in fig. 5, as to permit the use of three bolts instead of two, one each side of the axle, and, further, to permit them to be inserted out of line, thus giving additional strength to the axle and to the whole power.

Fifthly, in the use and arrangement of the truss-rod, marked C in fig. 2, and marked D in fig. 4, which connects the two axles, and, having nuts on the ends, holds the wheels to their places, equalizes the strain upon the axles, and adds much to the strength of the corner-pieces, marked F in fig. 1, and thus removes, to a very great degree, the danger of breaking, to which the machine, as originally patented by the inventor and made by me, was liable.

Sixthly, in giving greater strength to that portion of the axle marked G in figs. 5 and 6, by the convexity of the outside on the horizontal line, and the concavity of the same on the perpendicular line.

What I claim as my improvement, and desire to secure by Letters Patent, is—

1. The axle, made in the form shown and described, and provided with the strengthening bar A, as and for the purpose specified.

2. The wrought-iron eye-bolt B, when used in the connection and for the purpose specified and shown.

3. The enlargement or swell E of the flange of the axle, to permit of the said flange being perforated by the three holes out of line with each other, for the purpose specified.

4. The truss-rod C connecting the two axles, substantially as described.

MASSENA B. ERSKINE.

Witnesses:
JNO. G. McMYNN,
E. R. GRIFFITH.